United States Patent [19]

Takeno et al.

[11] Patent Number: 5,532,434
[45] Date of Patent: Jul. 2, 1996

[54] INSULATED WIRE

[75] Inventors: Shozui Takeno; Masaharu Moriyasu; Kazumichi Machida; Seiji Yasunaga, all of Hyogo, Japan

[73] Assignee: Mitsubishi Denki Kabushiki Kaisha, Tokyo, Japan

[21] Appl. No.: 278,167

[22] Filed: Jul. 21, 1994

[30] Foreign Application Priority Data

Jul. 26, 1993 [JP] Japan ................................. 5-183893

[51] Int. Cl.⁶ ............................................... H01B 7/00
[52] U.S. Cl. ..................... 174/110 R; 174/110 E; 174/110 N; 174/110 H; 174/110 SR; 174/120 SR
[58] Field of Search ................... 174/110 R, 110 E, 174/110 N, 110 A, 110 SR, 120 R, 120 SR

[56] References Cited

U.S. PATENT DOCUMENTS

| | | | |
|---|---|---|---|
| 2,754,353 | 7/1956 | Gilliam | 174/120 R |
| 2,802,897 | 8/1957 | Hurd et al. | 174/110 SR |
| 3,540,203 | 11/1970 | Thoresen et al. | 57/149 |
| 3,743,894 | 7/1973 | Hall et al. | 317/234 R |
| 4,503,124 | 3/1985 | Keane et al. | 174/120 SR |
| 4,571,453 | 2/1986 | Takaoka et al. | 174/110 A |

FOREIGN PATENT DOCUMENTS

| | | |
|---|---|---|
| 1058115 | 5/1959 | Germany . |
| 1961055 | 4/1974 | Germany . |
| 281141A1 | 8/1990 | Germany . |
| 60-98808 | 6/1985 | Japan . |
| 62-92712 | 4/1987 | Japan . |
| 2-195604 | 8/1990 | Japan . |
| 3-257711 | 11/1991 | Japan . |
| 5-120924 | 5/1993 | Japan . |

*Primary Examiner*—Kristine L. Kincaid
*Attorney, Agent, or Firm*—Wolf, Greenfield & Sacks

[57] ABSTRACT

An insulated wire having a conductor coated with insulating material wherein a light absorbing layer is provided between the conductor and the insulating material, thereby an insulating coating can be easily peeled off by means of laser.

17 Claims, 8 Drawing Sheets

INSULATED WIRE

BACKGROUND OF THE INVENTION

(1) Field of the Invention

The present invention relates to an insulated wire such as a winding or magnet wire used as a coil or the like in electric machinery and apparatus, communicating equipment, and electronic application devices.

(2) Description of the Related Art

Windings (magnet wires) are largely grouped into baked wires and fiber or paper covered windings. FIG. 7 is a diagram showing a cross section of a conventional baked wire. In the baked wire in which synthetic enamel 1 of various kinds such as polyurethane, polyester, polyesterimide, polyamideimide, polyamide, or the like is coated and baked on a conductor 3 shown in FIG. 1, the enamel 1 on the connecting portion must be removed when wiring is to be carried out.

Conventionally, the synthetic enamel on the baked wire is often mechanically peeled, however, this is not suitable because wires used in many electronic devices are mounted with a high density, tend to be thin so that they art easily cut by mechanical stresses.

In one conventional alternative to the above method the baked wire is dipped in chemicals. This method, however, can be hazardous because a dangerous chemical process must be conducted.

One method for removing the synthetic enamel from the baked thin wire easily, without using a dangerous chemical process, uses a laser as described in, for example, Japanese patent publication (Kokoku) No. 60-98808, Japanese patent publication (Kokai) No. 62-92712, and so forth. In this method, as shown in FIG. 2, laser lights 21 arc focused by a lens 22, and are irradiated on a conventional insulated wire 23 having a conductor coated with synthetic enamel of various kinds such as polyester and the like and baked, so that the synthetic enamel of various kinds, which is an insulator, is melted and evaporated and thus removed.

By this method, an insulator of a wiring wire such as a vinyl insulated wire, a polyethylene insulated wire, or the like in which the degree of close adhesion between a conductor and an electrical insulator is not high, the insulator can be completely removed. In a baked wire in which synthetic enamel of various kinds such as polyurethane, polyester, polyesterimide, polyamideimide, polyamide, and the like are coated and baked on a conductor, however, the degree of close adhesion between the insulator and the conductor is high so that the heat generated in the insulator by the laser irradiation is flown to the conductor. Therefore, the temperature of the insulator near the interface between the conductor and the insulating coating does not rise so that a thin film of 1 μm or less of the insulator remains on the surface of the conductor. This results in problems because conduction can not be effected or soldering cannot be effected.

Ultraviolet laser energy is absorbed into the insulator at a high absorption coefficient so that the thin film of the insulator does not remain, however, there are problems in that the speed for peeling the insulator is low, the running cost is high, and so forth. On the other hand, carbon dioxide laser or YAG laser generally well used in laser beam machining has low absorption coefficient so that there is the above-mentioned problem of the remainder of the thin film of the insulator.

SUMMARY OF THE INVENTION

The present invention has been conceived to solve the above-described problems. One object of the invention provides an insulated wire in which a coating can be removed within a short time and without leaving any of the insulator even when a baked wire having a high degree of close adhesion of an insulating coating is stripped by means of a wire stripper using a carbon dioxide laser or YAG laser.

According to a first aspect of the present invention, there is provided, for achieving the above objects, an insulated wire in which a layer having a high laser absorption coefficient is provided between the surface of a conductor and an insulating coating, thereby, even in a baked wire, a complete removal of the insulating coating by means of laser is realized without leaving any residual insulator.

As stated above, according to the first aspect of the present invention, the permeation depth of the laser beam in the layer having a high laser absorption coefficient and between the conductor and the insulator is very small. Accordingly, the laser beam penetrated through the insulator is absorbed in the extreme surface layer of this layer so that it reaches a high temperature. Therefore, the temperature of the insulator abutting against the light absorbing layer also rises due to thermal conduction and reaches a decomposing temperature so that the insulator is completely removed. In addition, the light absorbing layer itself can be removed to be very thin in a similar way as the removal of the insulator. Since the permeation depth of the laser beam is very small, the thin light absorbing layer effectively absorbs the laser beam so that the temperature rises and causes melting and evaporation, and, as a result, the insulator is completely removed. Accordingly, even in a baked wire, a complete removal of the insulating coating by an irradiating laser is achieved without any residual insulator.

According to a second aspect of the present invention, in the insulated wire according to the first aspect of the present invention, the light absorbing layer is provided by a roughened surface or by a metal of low melting point.

As stated above, according to the second aspect of the present invention, a part of the laser beam penetrated through the insulator is absorbed in the outer surface of metal, or alloy of a low melting point, so that the temperature of the metal or the alloy of the low melting point rises to melt the metal or the alloy. After the metal or the alloy is melted, the laser beam absorption coefficient is rapidly increased so that the temperature of this layer increases to a high temperature. Therefore, the temperature of the insulator adjacent this layer is also increased due to thermal conduction to reach a decomposing temperature so that the insulator is completely removed. As a result, even in a baked wire, a complete removal of the insulating coating by an irradiating laser is achieved without any residual insulator.

According to the second aspect of the present invention also, by performing a process on the surface of the conductor to make a roughened surface, the laser beam penetrated through the insulator causes a multiple reflection on the surface of the conductor, so that the laser beam absorption coefficient on the surface of the conductor is seemingly increased. Therefore, the temperature of the surface of the conductor rises so that the temperature of the insulator abutting against the surface of the conductor is also increased due to thermal conduction to reach a decomposing temperature, resulting in that the insulator is completely removed. As a result, even in a baked wire, a complete removal of the insulating coating by irradiating a laser is realized without any residual insulator.

According to a third aspect of the present invention the cross section of the insulated wire is constructed to have an insulating layer including a gas layer or bubbles, thereby, even in a baked wire, a complete removal of the insulating coating by an irradiating laser is achieved without residual insulator.

As stated above, according to the third aspect of the present invention, by making the cross section of the insulated wire to have an insulating layer including a gas layer between the conducting layer and the insulator, the heat generated in the insulator is hardly dissipated and as a result the temperature of the insulator rises to reach a decomposing temperature, and the insulator is completely removed. As a result, even in a baked wire, a complete removal of the insulating coating by means of a laser is achieved without any residual insulator. When bubbles are included in the insulating layer, the mode of operation is the same as above.

According to a fourth aspect of the present invention, a roughened surface and an insulating layer including bubbles are provided between an insulator and a conductor.

As stated above, according to the fourth aspect of the present invention, the roughened surface may be made by the process according to the second aspect of the present invention and the mode operation by providing the insulating layer including bubbles are obtained.

According to a fifth aspect of the present invention, in addition to the forth aspect, a metal layer of a low melting point may be provided on the wire.

As stated above, according to the fifth aspect of the present invention, in addition to the mode of operation according to the above-described fourth aspect providing the metal layer of low melting point according to the second aspect of the present invention can be obtained.

According to the sixth aspect of the present invention, the insulator on the conductor is enamel.

According to the seventh aspect of the present invention, the light absorbing layer has an absorption coefficient of 1000/cm or more of light having a wave length of 0.9 to 11.0 μm.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Embodiment 1

Figure 1:
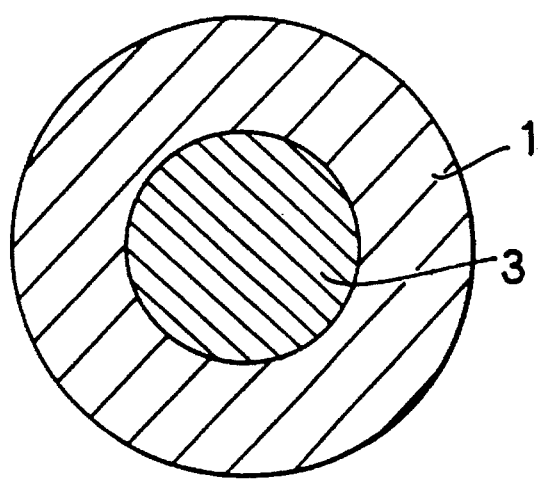
FIG. 1 is a schematic diagram showing the construction of a conventional insulated wire.
Figure 2:
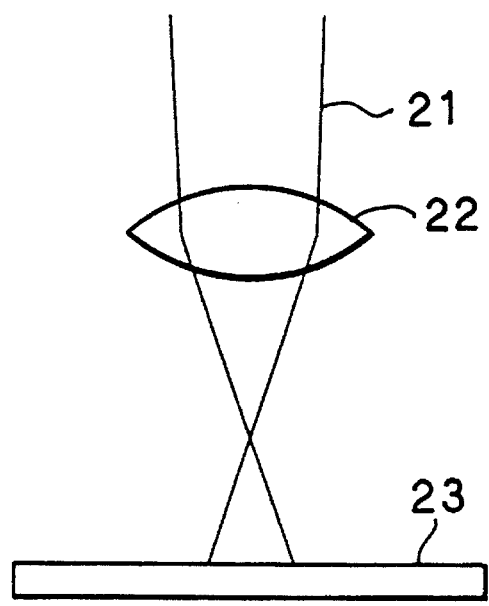
FIG. 2 is a schematic diagram showing a construction of a wire strip method by means of laser.
Figure 3:
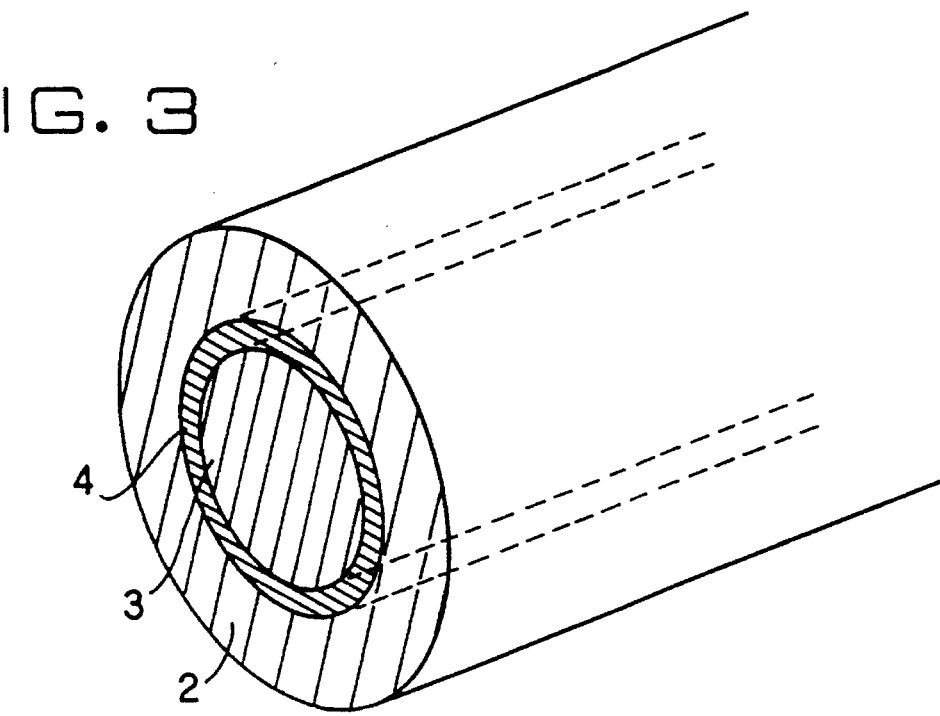
FIG. 3 is a schematic diagram showing the construction of an insulated wire according to an embodiment 1 of the present invention.

FIG. 3 is a diagram which shows a cross section of an insulated wire according to an embodiment of the present invention. In FIG. 1, is an insulator 2 covers a conductor 3 over material 4 having a laser beam absorption coefficient of 1000/cm or more, In this embodiment, polyester resin having a thickness of 8 μm was as the insulator; and a copper wire having a diameter of 100 μm used as the conductor. Further, as the light absorber, carbon having an absorption coefficient of 1000/cm with respect to carbon dioxide laser having a wave length of 10.6 μm was formed with a thickness of 1 μm on the surface of the copper by vacuum evaporation.

On this insulated wire with the insulating coating, when a laser beam was focused by using a lens in such a way that the carbon dioxide laser, with an irradiating energy density adjusted to be 5 J per 1 square centimeter was irradiated on the above-mentioned insulated wire under the conditions of a 7 mm×7 mm area, the irradiating time of 2 μs per one irradiation, the irradiating frequency of 10 Hz, and the number of irradiations ws 6. The insulator and the carbon evaporation film was completely removed at the beam irradiated part on the insulated wire without any damage of the copper wire. After the removal, when the insulated wire was put into a solder bath of 200° C., soldering was effectively carried out at the removed part without coating flux, and a sufficient electrical conduction was effected. Even if a little amount of carbon remains, it does not cause a problem in the electrical conduction because the carbon has a conductivity.

In the above-described embodiment, carbon was used as the light absorbing layer, however, it should be noted that the same effect can be also obtained by using material having a laser beam absorption coefficient of 1000/cm or more, such as, for example, alumina having a light absorption coefficient of about 10000/cm with respect to a laser beam having a wave length of 10.6 μm.

In the above-described embodiment, the carbon layer as the light absorbing layer was used in the vacuum evaporation, however, it should be noted that it is a matter of course that the same effect can be also obtained by using carbonized material of high molecular compound.

For example, an enamel wire having a copper wire with a diameter of 100 μm and coated by nylon resin with a thickness of 1 μm may be passed through a furnace with a temperature of 800° C. to form a carbonized film of nylon resin. Then, nylon resin with a thickness of 8 mm was coated on the carbonized film and baked. Accordingly, by this method, the carbon film can be easily formed.

On this insulated wire with the insulating coating, when a laser beam was focused by using a lens in such a way that the carbon dioxide laser with an irradiating energy density adjusted to be 5 J per 1 square centimeter, was irradiated on the above-mentioned insulated wire. The laser beam as focused under conditions of a 7 mm×7 mm area, the irradiating time of 2 μs per one irradiation, the irradiating frequency of 10 Hz, and the number of irradiations was 6. The insulator and the carbonized film were completely removed at the beam irradiated part on the insulated wire without any damage of the copper wire. After the removal, when the insulated wire was put into a solder bath of 200° C., soldering was effectively carried out at the removed pan by coating flux (RMA) on the removed part, and a sufficient electrical conduction was effected.

Embodiment 2

Figure 4:
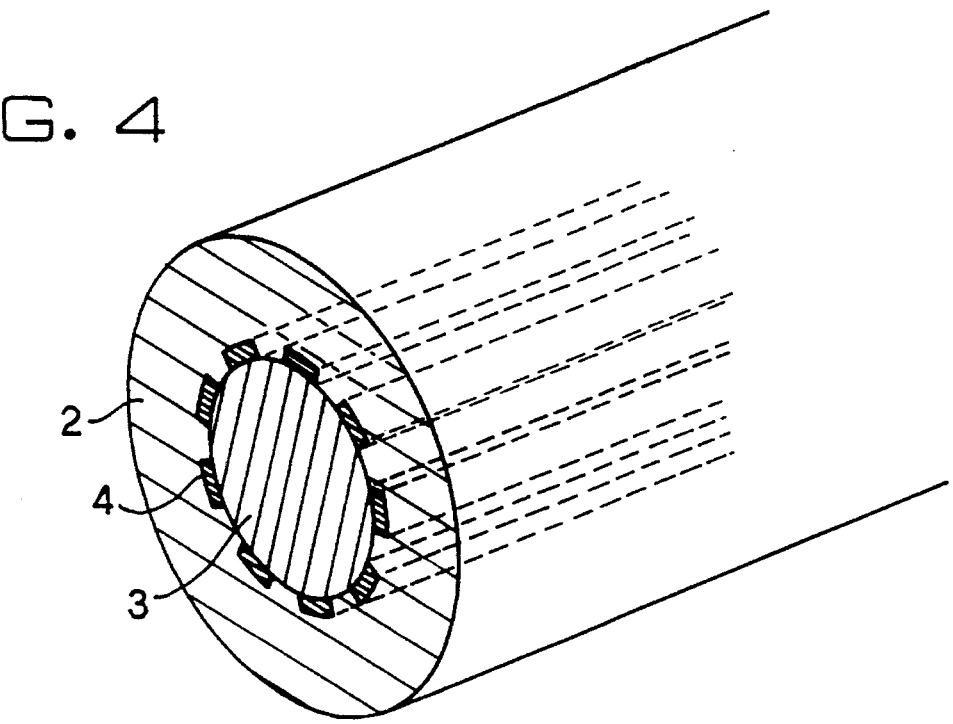
FIG. 4 is a schematic diagram showing the construction of an insulated wire according to an embodiment 2 of the present invention.

FIG. 4 is a diagram showing a structure of a cross section of an insulated wire according to another embodiment of the present invention. In FIG. 4, insulator 2 covers a conductor 3. Between the insulator 2 and the conductor 3, there are stripes formed by a material having a laser beam absorption coefficient of 1000/cm or more. In this embodiment, polyurethane resin having a thickness of 8 μm was used as the insulator; and a copper wire having a diameter of 100 μm was used as the conductor. Further, as the light absorber, carbon having an absorption coefficient of 10000/cm with respect to carbon dioxide laser having a wave length of 10.6 μm was formed by injecting carbon spray (the trade name: aerodag 504, made by ACHESON COLLOITS company: England) on the surface of the copper wire.

On this insulated wire, when laser beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μs per one irradiation, the irradiating frequency of 10 Hz, and the number of irradiations is 6, then the insulator and the carbon evaporation film was completely removed at the place where the carbon film was present in the beam irradiated part on the insulated wire without any damage of the copper wire. After the removal, when the insulated wire was put into a solder bath of 200° C., and soldering was effectively carried out at the removed part and its periphery without coating flux, and a sufficient electrical conduction was effected. Since the electrical connection is sufficient as long as solder can be coated on the portion where the carbon film is not present, there is no disadvantage even if a portion of the carbon film remains and solder can not be coated on the portion where the carbon film has not been removed.

Embodiment 3

Figure 5:
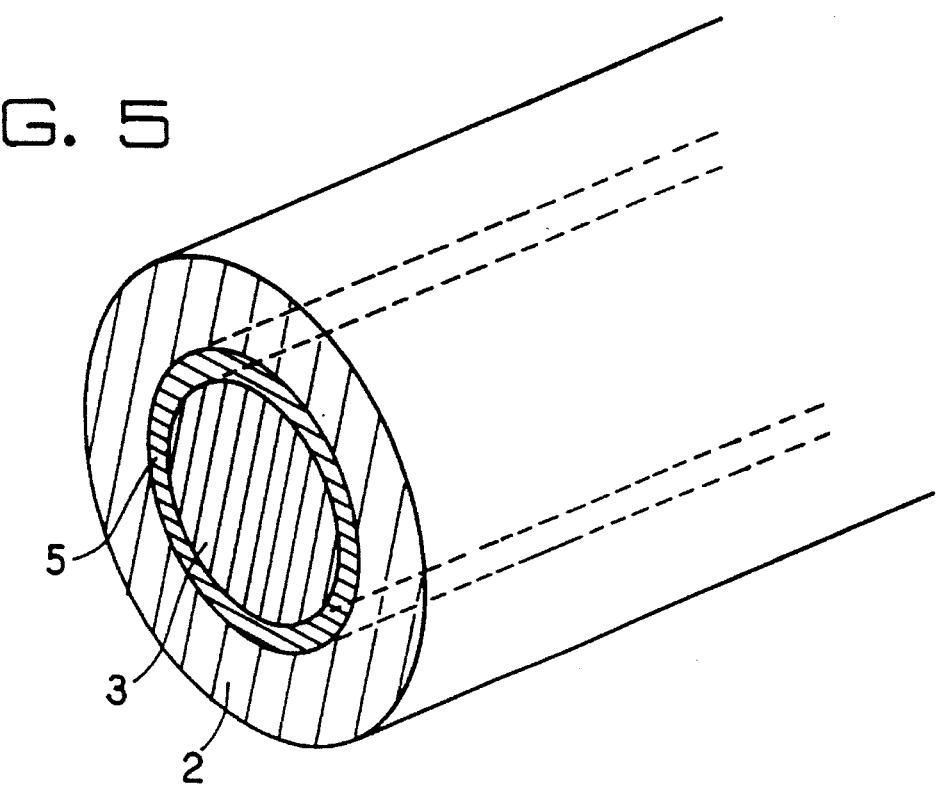
FIG. 5 is a schematic diagram showing the construction of an insulated wire according to an embodiment 3 of the present invention.

FIG. 5 is a diagram showing a structure of a cross section of an insulated wire according to still another embodiment of the present invention. In FIG. 5, reference numeral 2 is polyamideimide resin as an insulator 2 covers a copper wire as a conductor 3 on the surface of which copper oxide 5 which is a chemical compound of oxygen and copper is formed as a light absorbing layer. In this embodiment, polyamideimide resin having a thickness of 8 μm was used as the insulator; and a copper wire having a diameter of 100 μm on the surface of which copper oxide having a thickness of 0.1 μm was used as the conductor. The oxide layer was formed by raising the temperature of the copper wire up to 500° C. in an atmosphere. The copper oxide is provided because it has a high laser absorption coefficient.

On this insulated wire, if a portion of the carbon film remains and laser beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μs per one irradiation, the irradiating frequency of 10 Hz, and the number of irradiations is 6, then the insulator was completely removed at the beam irradiated part on the insulated wire without any damage of the copper wire. After the removal, when the insulated wire was put into a solder bath of 200° C., and that soldering was effectively carried out at the removed part only by coating flux (RMA) on the removed part, and a sufficient electrical conduction was effected.

Embodiment 4

Figure 6:
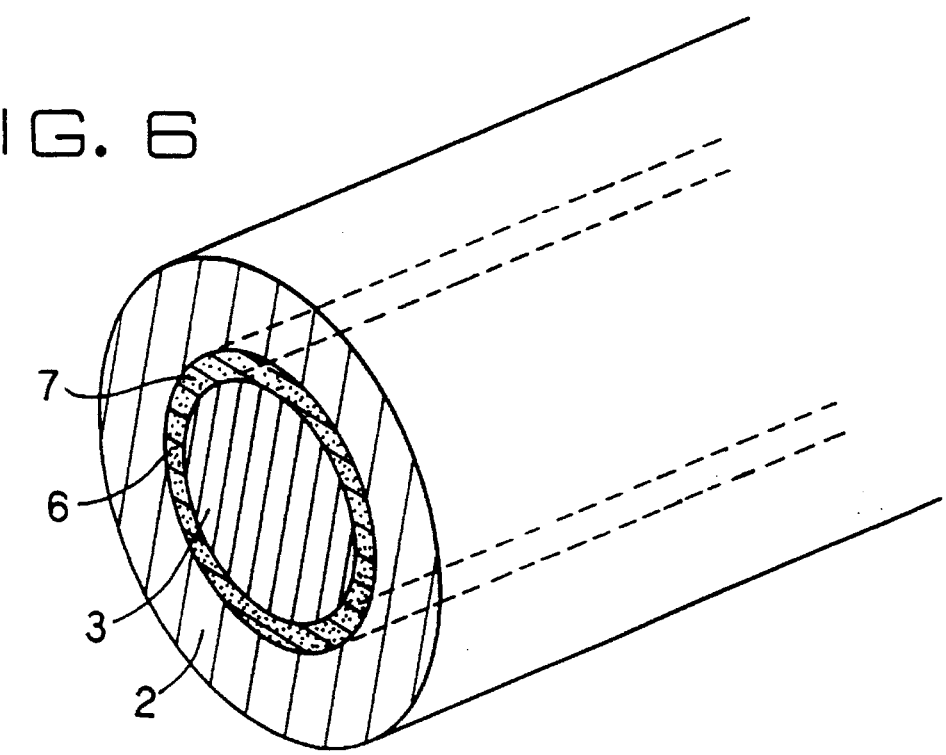
FIG. 6 is a schematic diagram showing the construction of an insulated wire according to an embodiment 4 of the present invention.

FIG. 6 is a diagram showing a structure of a cross section of an insulated wire according to still another embodiment of the present invention. In FIG. 6, reference numeral 2 is an insulator covering a conductor 3 through an insulating film 7 including fine grains 6 of laser beam absorber. In this embodiment, polyester resin having a thickness of 5 μm was used as the insulator; and a copper wire having a diameter of 100 was used as the conductor. Further, as the light absorber, the fine grains of alumina having an absorption coefficient of 10000/cm with respect to carbon dioxide laser having a wave length of 10.6 μm, and each fine grain having a diameter of 2 μm, were used, and a mixture was prepared by adding a small amount of polyester to them and was coated with a thickness of 3 μm on the surface of the copper, and then it was coated by polyester. On this insulated wire, when a laser beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μs per one irradiation, the irradiating frequency of 10 Hz, and the number of irradiations is 6, then the insulator and the alumina fine grains were completely removed at the beam irradiated part on the insulated wire without any damage of the copper wire. After the removal, the insulated wire was put into a solder bath of 200° C., and soldering was effectively carried out at the removed part without coating flux on the removed part, and a sufficient electrical conduction was effected.

In addition, in the above-described embodiments 1 to 4, the thickness of the light absorbing layer was in the range between 0.1 to 1 μm, however, the same effect can be obtained as long as the thickness is such that the beam can be absorbed in a certain amount. For example, as a matter of course, the laser beam absorption coefficient is 1000/cm, the thickness may be 0.05 μm or more.

Figure 7:
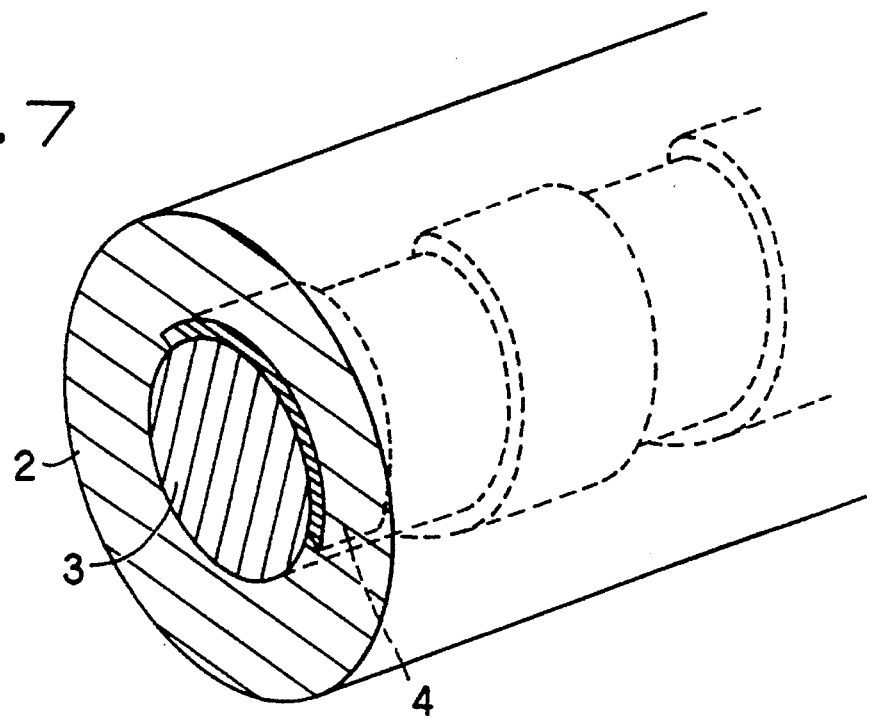
FIG. 7 is a schematic diagram showing another construction of an insulated wire according to the present invention.
Figure 8:
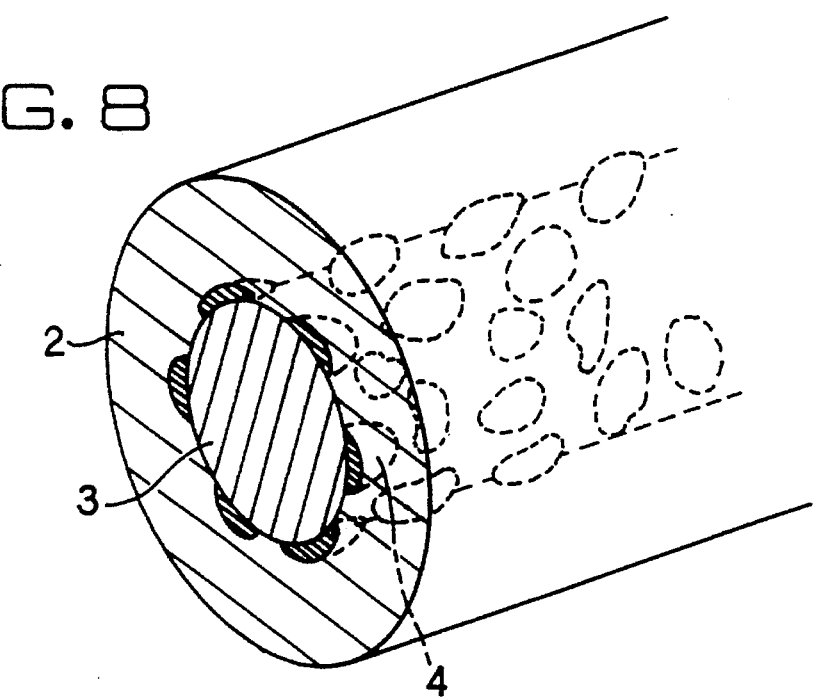
FIG. 8 is a schematic diagram showing another construction of an insulated wire according to the present invention.

It should be noted that, in the above-described embodiments 1 to 4, the light absorbing layer was formed to have the stripe shape on the whole surface of in the longitudinal direction, however, as a matter of course, the completely same effect can be obtained by forming it in a spiral shape in the longitudinal direction as shown in FIG. 7, or a shape of random islands as shown in FIG. 8.

Embodiment 5

Figure 9:
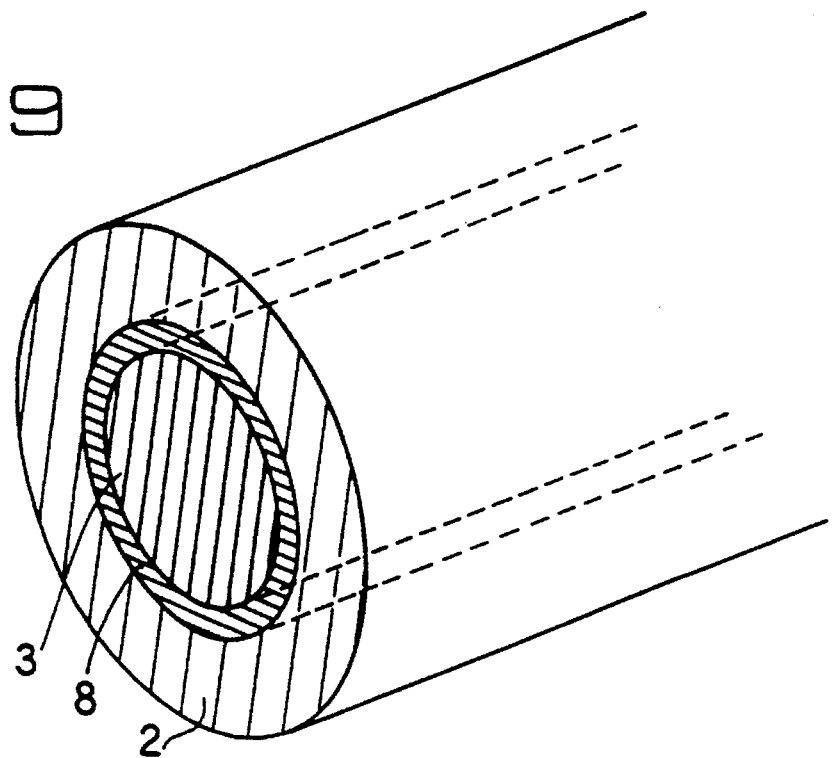
FIG. 9 is a schematic diagram showing the construction of an insulated wire according to an embodiment 5 of the present invention.

FIG. 9 is a diagram showing a cross section of an insulated wire according to still another embodiment of the present invention. In FIG. 9, an insulator 2 covers the surface of a conductor 3 through a metal or alloy 8 having a low melting point. In this embodiment, polyimide resin having a thickness of 7 μm was used as the insulator; and a copper wire having a diameter of 100 μm was used as the conductor. Further, as the alloy having the low melting point, solder having a melting point of 180° C. was formed with a thickness of 1 μm by solder plating on the surface of the copper wire.

On this insulated wire, when a laser beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μs per one irradiation, the irradiating frequency of 10 Hz, and the number of irradiations is 6, then the insulator was completely removed at the beam irradiated part on the insulated wire without any damage of the copper wire, After the removal, by utilizing the solder layer on the surface, soldering was effectively carried out without supplying additional solder, and a sufficient electrical conduction was effected.

Embodiment 6

In this embodiment, polyimide resin having a thickness of 7 μm was used as the insulator; and a copper wire having a diameter of 100 μm was used as the conductor. Further, as the metal having the low melting point, zinc having a melting point of 692° C. and a boiling point of 1179° C. was formed with a thickness of 1 μm by zinc plating on the surface of the copper wire.

On this insulated wire, when laser beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μs per one irradiation, the irradiating frequency of 10 Hz, and the number of irradiations is 6, then the insulator and the part plated with zinc were completely removed at the beam irradiated part on the insulated wire without any damage of the copper wire. After the removal, the insulated wire was put into a solder bath of 200° C., and soldering was effectively carried out at the removed part without coating flux on the removed part, and a sufficient electrical conduction was effected.

Embodiment 7

Figure 10:
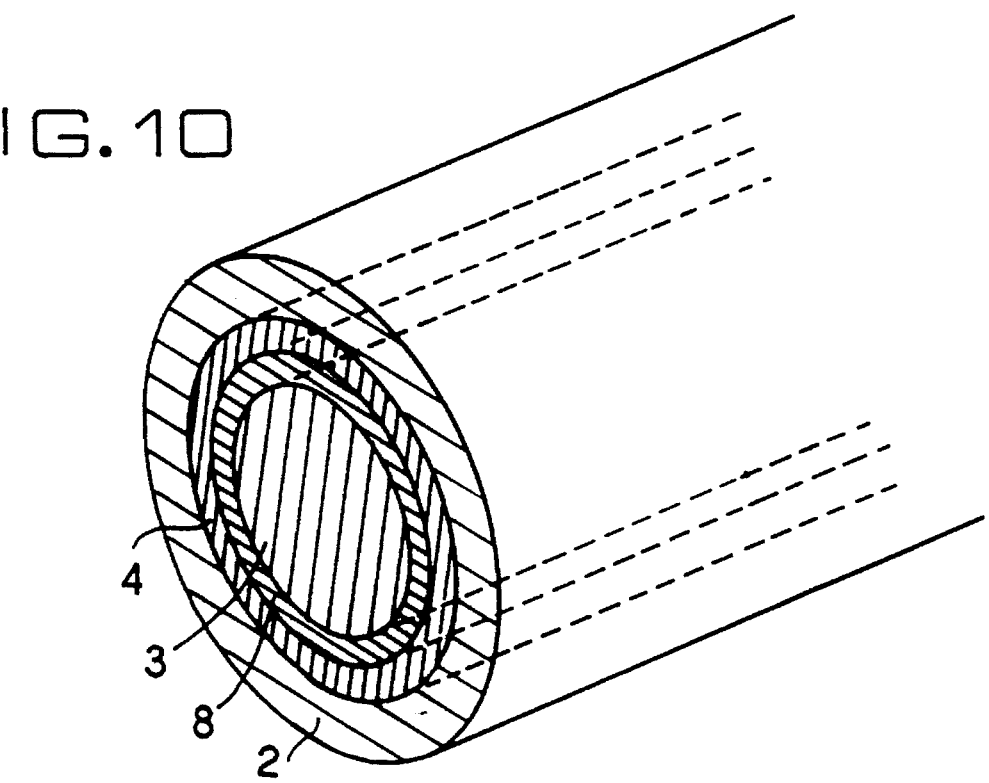
FIG. 10 is a schematic diagram showing the construction of an insulated wire according to an embodiment 7 of the present invention.

FIG. 10 is a diagram showing a cross section of an insulated wire according to still another embodiment of the present invention. In FIG. 10, an insulator 2 covers through a material 4 which has a laser beam absorption co-efficient of 1000/cm or more, a conductor 3 having a surface on which metal or alloy of a low melting point is formed. In this embodiment, polyimide resin having a thickness of 7 μm was used as the insulator; and a copper wire having a diameter of 100 μm was used as the conductor. Further, as the alloy having the low melting point, solder having a melting point of 180° C. was formed with a thickness of 1 μm by solder plating on the surface of the copper wire. Still further, as the light absorption layer, carbon, having an absorption coefficient of 10000/cm or more with respect to carbon dioxide laser having a wavelength of 10.6 μm is formed on the copper surface which is plated with solder having a thickness of 0.5 μm by means of vacuum deposition. Even if the soldering plated part is not completely removed by the laser and a small amount thereof remains, there is no disadvantage for a soldering process thereafter.

On this insulated wire, a beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μs per one irradiation, the irradiating frequency of 10 Hz, and the number of irradiations is 6, then the insulator and the carbon were completely removed at the beam irradiated part on the insulated wire without any damage of the copper wire. After the removal, by utilizing the solder layer on the surface, soldering was effectively carried out without supplying additional solder, and a sufficient electrical conduction was effected.

Embodiment 8

Figure 11:
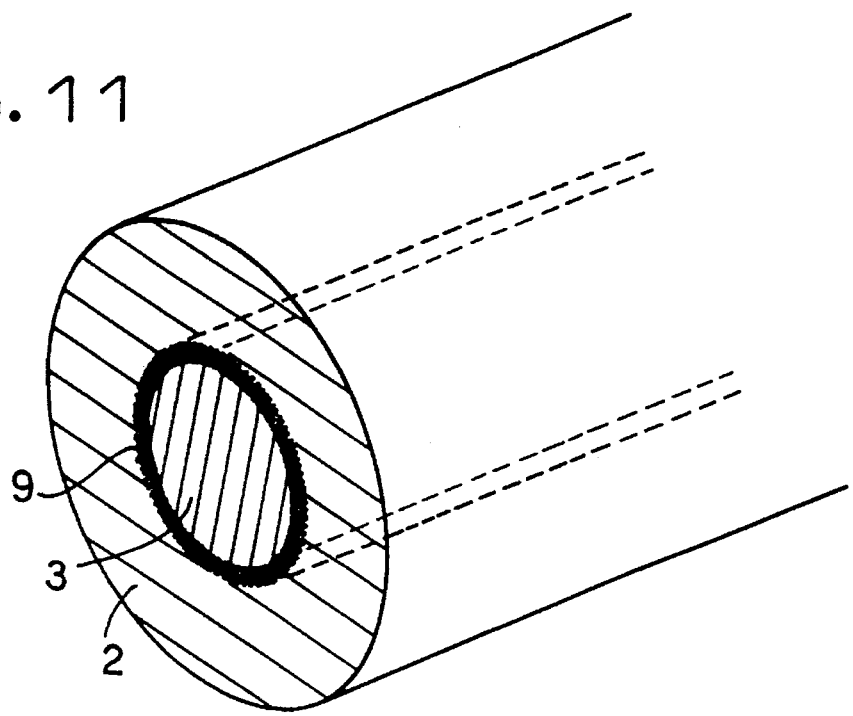
FIG. 11 is a schematic diagram showing the construction of an insulated wire according to an embodiment 8 of the present invention.

FIG. 11 is a diagram showing a structure of a cross section of an insulated wire according to still another embodiment of the present invention. In FIG. 11, an insulator 2 covers a roughened surface of a conductor 3. In this embodiment, epoxy resin having a thickness of 8 μm was used as the insulator; and a copper wire having a diameter of 100 μm was used as the conductor. Further, a process to make a toughened surface was performed by electrically uniformly adhering fine gains consisting of copper oxide and copper and having a grain diameter of 10 μm on the surface of the copper wire in such a way that the insulated wire was made to be − and the grains were made to be +, and then it was coated by epoxy resin.

On this insulated wire, when laser beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μs per one irradiation, the irradiating frequency of 10 Hz, and the number of irradiations is 6, then the insulator was completely removed at the beam irradiated part on the insulated wire without any damage of the copper wire. After the removal, the insulated wire was put into a solder bath of 200° C., and solder effectively carried out at the removed part without coating flux on the removed part, and a sufficient electrical conduction was effected.

Embodiment 9

In this embodiment, polyester resin having a thickness of 5 μm was used as the insulator; a copper wire having a diameter of 100 μm was used as the conductor. Further, as the process for making the roughened surface, two kinds of methods were employed, i.e., one in which the insulated wire was abraded by an emery paper corresponding to #300; and the other in which the copper wire was made to be −, and aqueous solution of copper sulfate was made to be − so as to deposit copper on the conductive wire to from an irregular surface of about 10 μm.

On this insulated wire, when laser beam was focused by using a lens in such a way that the carbon dioxide laser with an irradiating energy density adjusted to be 5 J per 1 square centimeter was irradiated on the above-mentioned insulated wire under the condition of the size of 7 mm×7 mm, the irradiating time of 2 μs per one irradiation, the irradiating frequency of 10 Hz, and the number of irradiations is 6, then in both methods, the insulator was completely removed at the beam irradiated part on the insulated wire without any damage of the copper foil. After the removal, when the insulated wire was put into a solder bath of 200° C., soldering was effectively carried out at the removed part without coating flux on the removed part, and a sufficient electrical conduction was effected.

Embodiment 10

Figure 12:
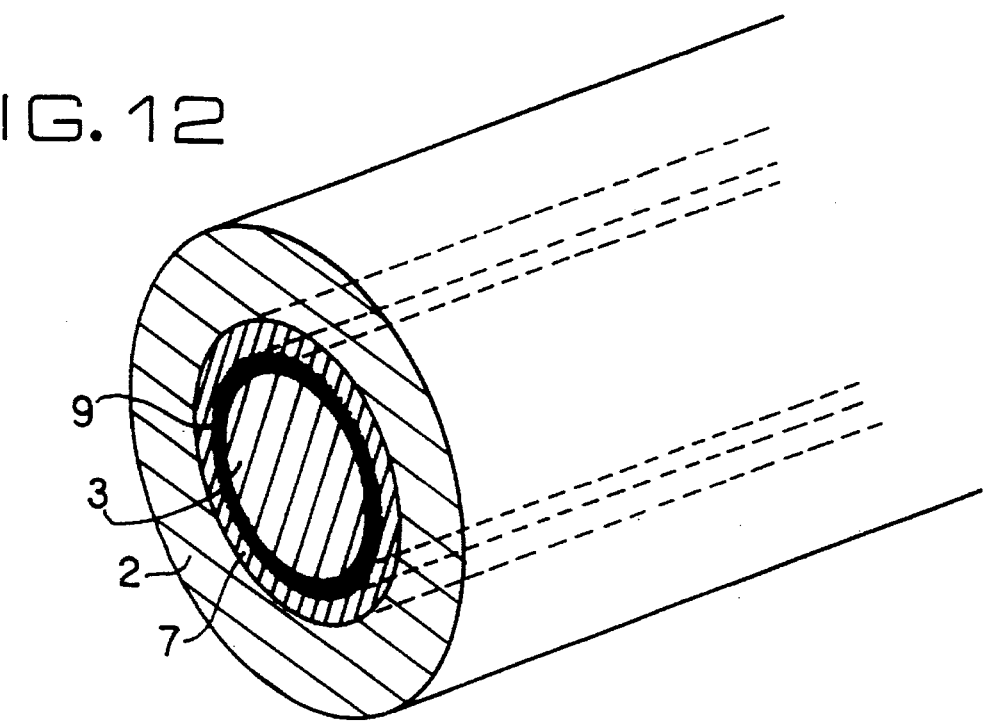
FIG. 12 is a schematic diagram showing the construction of an insulated wire according to an embodiment 10 of the present invention.

FIG. 12 is a diagram showing a cross section of an insulated wire according to still another embodiment of the present invention. In FIG. 12, an insulator 2 covers a toughened surface 9 of a conductor 3 through metal or alloy 7 which has a low melting point. In this embodiment, as the insulator, epoxy resin having a thickness of 8 μm was used as the insulator; and a copper wire having a diameter of 100 μm to which a process to make a roughened surface was performed by electrically uniformly adhering fine gains consisting of copper oxide and copper and having a grain diameter of 10 μm on the surface of the copper wire in such a way that the insulated wire was made to be − and the gains were made to be +, was used, Further, as the metal having the low melting point, solder having a melting point of 180° C. was formed with a thickness of 1 μm on the surface of the copper by soldering plating.

On this insulated wire, when laser beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μm per one irradiation, the irradiating frequency of 10 Hz, and the number of irradiations is 6, then the insulator was completely removed at the beam irradiated part on the insulated wire without any damage of the copper wire. After the removal, by utilizing the solder layer on the surface, soldering was effectively carried out without supplying additional solder, and a sufficient electrical conduction was effected.

It should be noted that in the above described embodiments 5 to 10, the low-melting point metal layer or the processed portion to be the roughened surface was formed on the whole surface, however, the same effect can be obtained by forming the light absorbing layer in any shape such as a stripe shape or random islands shape. In addition, the similar effect as in the embodiments 9 or 10 can be obtained by performing the process for making the roughened surface by means of sand blasting.

Embodiment 11

Figure 13:
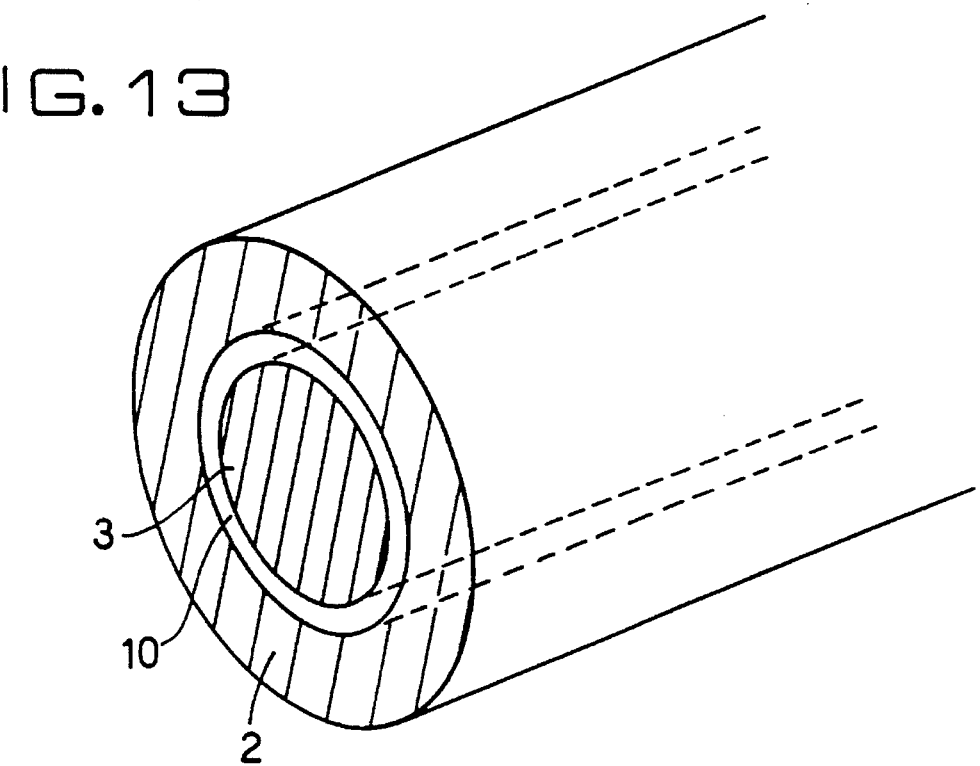
FIG. 13 is a schematic diagram showing the construction of an insulated wire according to an embodiment 11 of the present invention.

FIG. 13 is a diagram showing a structure of a cross section of an insulated wire according to still another embodiment of the present invention. In FIG. 13, an insulator 2 covers a conductor 3 through a gas layer 10. In this embodiment, polyurethane resin having a thickness of 10 μm was used as the insulator; and a copper wire having a diameter of 100 μm was used as the conductor. The gas layer was formed by cooling first-class polyurethane copper wire at −40° C. for three hours, then returning it to have the normal temperature by using 30 minutes, and then causing a plastic deformation by elongating it with a tensile speed of 40 cm/minute until it was cut. At this time, a crevice was formed in the coating film, and a space of about 0.1 μm was formed between the coating film and the conductor layer.

On the plastic deformation portion of the insulated wire, when laser beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μs per one irradiation, the irradiating frequency of 10 Hz, and the number of irradiations is 6, then the insulator was completely removed at the beam irradiated part on the insulated wire without any damage of the copper wire. After the removal, when the insulated wire was put into a solder bath of 200° C., it was acknowledged that soldering was effectively carried out at the removed pan without coating flux on the removed pan, and a sufficient electrical conduction was effected.

Embodiment 12

Figure 14:
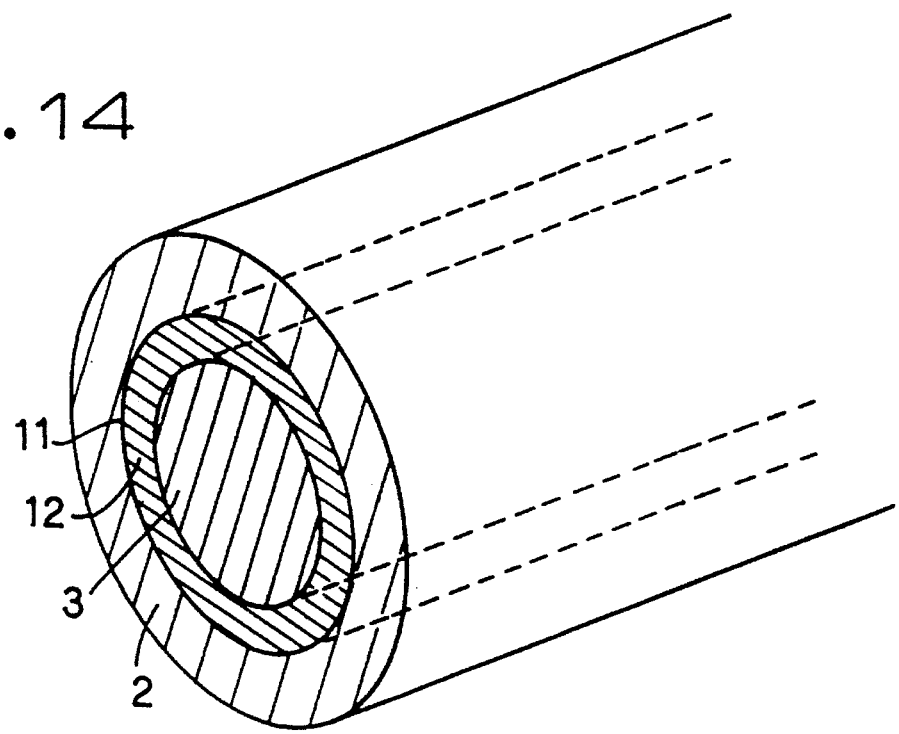
FIG. 14 is a schematic diagram showing the construction of an insulated wire according to an embodiment 12 of the present invention.

FIG. 14 is a diagram showing a cross section of an insulated wire according to still another embodiment of the present invention. In FIG. 14, an insulator 2 covers a conductor 3 through an insulating layer 11 including a number of pinholes. In this embodiment, as the insulator, polyurethane resin having a thickness of 10 μm was used; and as the conductor, a copper wire having a diameter of 100 μm was used. The insulating layer including a number of pinholes was formed by churning polyurethane resin before hardening to mix a number of gas bubbles, or by adding a foaming agent to polyethylene resin to form it, In either case, the copper wire was coated with a thickness of 10 μm.

On this insulated wire, when laser beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μm per one irradiation, the irradiating frequency of 10 Hz, and the number of irradiations is 6, then the insulator was completely removed at the beam irradiated part on the insulated wire without any damage of the copper wire, After the removal, when the insulated wire was put into a solder bath of 200° C., soldering was effectively carried out at the removed pan without coating flux on the removed pan, and a sufficient electrical conduction was effected.

Embodiment 13

In this embodiment, as the insulator, polyesterimidepolyamideimide resin having a thickness of 15 μm was used; and as the conductor, a copper wire having a diameter of 200 μm was use. The gas layer was formed by soaking one kind polyesterimidepolyamideimide copper wire having a conductor diameter of 200 μm into water for six days so as to lower the degree of close adhesion between the copper wire and the insulator. At this time, a space of 0.1 μm or less was formed between the coating and the conductor layer.

On this insulated wire, when laser beam was focused by using a lens in such a way that the carbon dioxide laser with an irradiating energy density adjusted to be 5 J per 1 square centimeter was irradiated on the above-mentioned insulated wire under the condition of the size of 7 mm×7 mm, the irradiating time of 2 μs per one irradiation, the irradiating frequency of 10 Hz, and the number of irradiations is 6, then the insulator was completely removed at the beam irradiated pan on the insulated wire without any damage of the copper wire. After the removal, the insulated wire was put into a solder bath of 200° C., and soldering was effectively carried out at the removed part without coating flux on the removed part, and a sufficient electrical conduction was effected.

Embodiment 14

Figure 15:
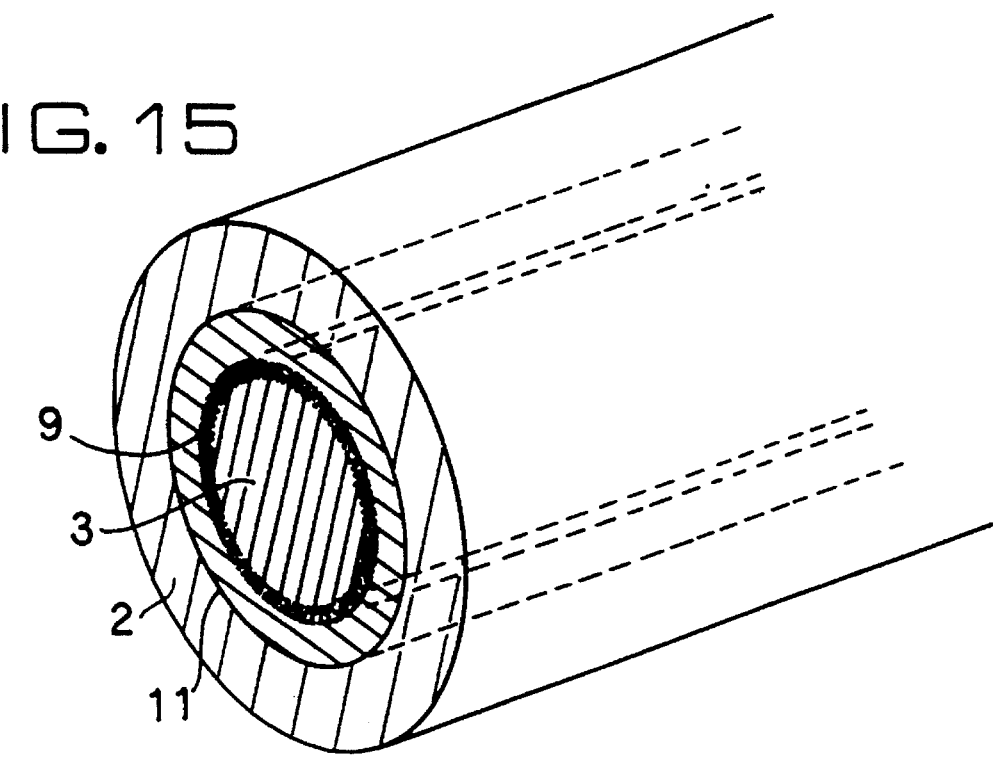
FIG. 15 is a schematic diagram showing the construction of an insulated wire according to an embodiment 14 of the present invention.

FIG. 15 is a diagram showing a structure of a cross section of an insulated wire according to still another embodiment of the present invention. In FIG. 15, an insulator 2 covers a conductor 3 which has a roughened surface through an insulating layer-11 including a number of pinholes. In this embodiment, polyurethane resin having a thickness of 10 μm was used as the insulator; a copper wire having a diameter of 100 μm was used as the conductor. The copper wire-has a surface processed to be toughened by electrically uniformly adhering, on the surface of the copper, fine gains each having a diameter of 10 μm and consisting of copper oxide and copper in such a way that the insulated wire was made to be − and the grains were made to be +. The insulating layer including the number of pinholes was formed by churning polyurethane before hardening to mix a number of gas bubbles to cover the copper wire with a thickness of 10 μm.

On this insulated wire, when laser beam was focused by using a lens in such a way that the carbon dioxide laser with an irradiating energy density adjusted to be 5 J per 1 square centimeter was irradiated on the above-mentioned insulated wire under the conditions of 7 mm×7 mm, the irradiating time of 2 μs per one irradiation, the irradiating frequency of 10 Hz, and the number of irradiations is 6, then the insulator was completely removed at the beam irradiated part on the insulated wire without any damage of the copper wire. After the removal, the insulated wire was put into a solder bath of 200 C, soldering was effectively carried out at the removed part without coating flux on the removed part, and a sufficient electrical conduction was effected.

Embodiment 15

Figure 16:
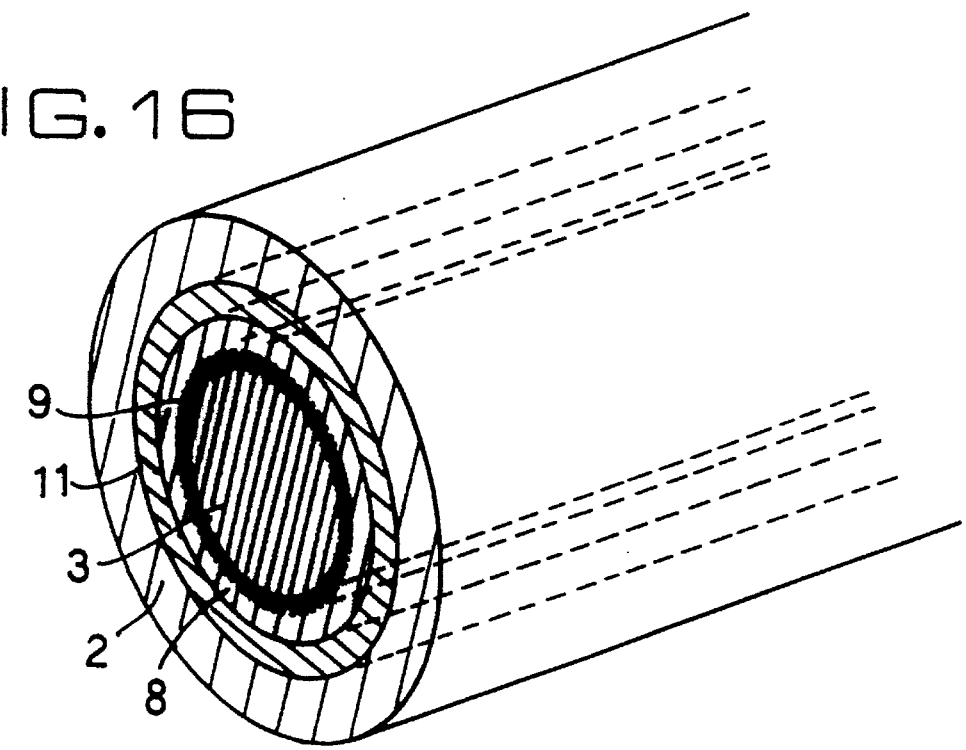
FIG. 16 is a schematic diagram showing the construction of an insulated wire. according to an embodiment 15 of the present invention.

FIG. 16 is a diagram showing a structure of a cross section of an insulated wire according to still another embodiment of the present invention. In FIG. 16, an insulator 2 covers a conductor 3 which has a surface processed to be roughened through an insulating layer 11 including metal or alloy 8 of a low melting point and a number of pinholes. In this embodiment, as the insulator, epoxy resin having a thickness of 8 μm was used; and as the conductor, a copper wire having a diameter of 100 μm was used. The copper wire has a surface processed to be roughened by electrically uniformly adhering, on the surface of the copper, fine gains each having a diameter of 10 μm and consisting of copper oxide and copper in such a way that the insulated wire was made to be and the grains were made to be Further, as the alloy having the low melting point, solder having a melting point of 180° C. was formed with a thickness of 1 μm on the surface of the copper by soldering plating. The insulating layer including the number of pinholes was formed by churning polyurethane before hardening to mix a number of gas bubbles to cover the copper wire with a thickness of 10 μm.

On this insulated wire, when laser beam was focused by using a lens in such a way that the carbon dioxide laser with an irradiating energy density adjusted to be 5 J per 1 square centimeter was irradiated on the above-mentioned insulated wire under the conditions of a size of 7 mm×7 mm, the irradiating time of 2 μs per one irradiation, the irradiating frequency of 10 Hz, and the number of irradiations is 6, then the insulator was completely removed at the beam irradiated part on the insulated wire without any damage of the copper wire. After the removal, by utilizing the solder layer on the surface, soldering was effectively carried out without supplying additional solder, and a sufficient electrical conduction was effected.

It should be noted that, in the above described embodiments, as the insulator, polyester resin, nylon resin, polyurethane resin, polyamideimide resin, polyamide resin, epoxy resin, or polyesterimidepolyamideimide resin was used, however, as a matter of course, the similar effect can be obtained in an enamel wire consisting of the other polymer material such as acrylic resin, polyvinyl formate resin, epoxy acrylic resin or the like. The light absorbing layer in each embodiment may not always be formed on the full length of the conductor, but may be sufficient to be formed on a part used as a connecting portion when it is wired. For example, it may be formed at the end of the conductor, or may be formed at the end and at regular intervals.

From the foregoing description, it will be apparent that, according to the first aspect of the present invention, the permeation depth of the laser beam in the layer having a high laser absorption coefficient and between the conductor and the insulator is very small the laser beam penetrated through the insulator is absorbed in the extreme surface layer of this layer so as to become a high temperature. Therefore, the temperature of the insulator abutting against the light absorbing layer also rises due to thermal conduction to reach a decomposing temperature so that the insulator is completely removed. In addition, even when the light absorbing layer itself is removed to be very thin in a similar way as the removal of the insulator, since the permeation depth of the laser beam is very small, the thin light absorbing layer effectively absorbs the laser beam so that the temperature rises to cause melting and evaporation, resulting in flint the insulator is completely removed. As a result, even in a baked wire, a complete removal of the insulating coating by irradiating laser is realized without residual insulator.

According to the second aspect of the present invention, a part of the laser beam penetrated through the insulator is absorbed in the outer surface of metal or alloy of a low melting point so that the temperature of the metal or the alloy of the low melting point rises to finally melt the metal or the alloy. After the metal or the alloy is melted, the laser beam absorption coefficient is rapidly increased so that the temperature of this layer further rises to be a high temperature. Therefore, the temperature of the insulator abutting against this layer is also increased due to thermal conduction to reach a decomposing temperature so that the insulator is completely removed. As a result, even in a baked wire, a complete removal of the insulating coating by irradiating laser is realized without residual insulator.

Also, by performing a process on the surface of the conductor to make a roughened surface, the laser beam penetrated through the insulator causes a multiple reflection on the surface of the conductor, so that the laser beam absorption coefficient on the surface of the conductor is seemingly increased. Therefore, the temperature of the surface of the conductor rises so that the temperature of the insulator abutting against the surface of the conductor is also increased due to thermal conduction to reach a decomposing temperature, resulting in that the insulator is completely removed. As a result, even in a baked wire, a complete removal of the insulating coating by irradiating a laser is realized without residual insulator.

According to the third aspect of the present invention, by making the cross section of the insulated wire to have an insulating layer including a gas layer between the conducting layer and the insulator, the heat generated in the insulator is hardly dissipated and as a result the temperature of the insulator rises to reach a decomposing temperature, and the insulator is completely removed. As a result, even in a baked wire, a complete removal of the insulating coating by means of a laser is realized without residual insulator. When bubbles are included in the insulating layer, the mode of operation is the same as above.

According to the fourth aspect of the present invention, the mode of operation by the roughened surface making process according to the second aspect of the present invention and the mode operation by providing the insulating layer including bubbles are obtained.

According to the fifth aspect of the present invention, in addition to the mode of operation according to the above described fourth aspect, the mode of operation by providing the metal layer of low melting point according to the second aspect of the present invention can be obtained

What is claimed is:

1. An insulated wire adapted to be stripped by energy emitted from an irradiating laser comprising:

a conductor coated with an insulating material;

a light absorbing layer provided between said conductor and the insulating material wherein the light absorbing layer is adapted to absorb the energy emitted from the irradiating laser and increase the temperature of the insulating material so that the insulating material is removed from the conductor.

2. An insulated wire as recited in claim 1, wherein the light absorbing layer is a film of carbon and is adapted to absorb energy emitted from the irradiating laser.

3. The insulated wire as claimed in claim 1, wherein the light absorbing layer is an insulating film including fine grains of alumina.

4. The insulated wire as claimed in claim 1, wherein the light absorbing layer is copper oxide.

5. An insulated wire as recited in claim 1, wherein the light absorbing layer is a metal having a low melting point and is adapted to absorb energy from the irradiating laser.

6. The insulated wire as recited in claim 5, wherein the light absorbing layer further includes a layer of carbon.

7. The insulated wire as recited in claim 1, wherein the light absorbing layer comprises a roughened surface of the surface of the conductor.

8. The insulated wire as recited in claim 7, wherein the roughened surface comprises fine grains of copper oxide and copper.

9. The insulated wire as recited in claim 1, wherein the light absorbing layer comprises at least one of a roughened surface having fine grains and a metal having a low melting point.

10. The insulated wire as claimed in claim 1, wherein the insulating material coated on the conductor is enamel.

11. The insulated wire as claimed in claim 1 wherein the light absorbing layer has an absorbing rate of 1000/cm or more of light having a wavelength in the range between 0.9 to 11.0 µm.

12. The insulated wire as recited in claim 1 wherein the light absorbing layer between the conductor and insulating material is formed of a plurality of strips.

13. The insulated wire as recited in claim 12 wherein strips of insulating material is disposed parallel to a longitudinal axis of the wire.

14. The insulated wire as recited in claim 12 wherein the strip of insulating material is disposed in a spiral configuration.

15. The insulated wire as recited in claim 1 wherein the light absorbing material is formed as random islands between the conductor and the insulating material.

16. An insulated wire adapted to be stripped by an irradiating laser comprising: a conductor coated with insulating material, a gas layer between said conductor and the insulating material whereby the gas layer is constructed and adapted to minimize dissipation of heat generated by the irradiating laser so as to allow the removal of insulating material from the conductor.

17. An insulated wire adapted to be stripped by an irradiating laser comprising: a conductor coated with insulating material, and a material having bubbles disposed between said conductor and the insulating material, said material having bubbles constructed and adapted to minimize the dissipation of heat generated by the irradiating laser to allow removal of the insulating layer from the conductor.

* * * * *